United States Patent
Altmeppen

[11] 3,772,890
[45] Nov. 20, 1973

[54] PRESSURE LIMITING DEVICE FOR VEHICULAR BRAKE SYSTEMS

[75] Inventor: Johannes Altmeppen, Ronnenberg, Germany

[73] Assignee: Westinghouse Bremsen-und Apparatebau GmbH, Hannover, Germany

[22] Filed: July 25, 1972

[21] Appl. No.: 274,859

[30] Foreign Application Priority Data
Sept. 28, 1971 Germany............... P 21 48 235.9

[52] U.S. Cl.................. 60/585, 60/592, 60/581
[51] Int. Cl............................................. F15b 7/08
[58] Field of Search .......... 60/54.6 R, 54.5 E, 60/54.6 E, 585, 592

[56] References Cited
UNITED STATES PATENTS
1,457,156  5/1923  Frock.................. 60/54.6 E
3,416,316  12/1968  Lewis................. 60/54.6 E
2,816,422  12/1957  Fletcher............... 60/54.6 R
2,368,659  2/1945  Heineck et al.......... 60/54.5 E FOREIGN PATENTS OR APPLICATIONS
567,192  10/1957  Italy.................. 60/54.6 R Primary Examiner—Martin P. Schwadron
Assistant Examiner—A. M. Zapcic
Attorney—Ralph W. McIntire, Jr.

[57] ABSTRACT

The invention deals with a pressure limiting device for fluid pressure brakes of road vehicles with at least one main cylinder to activate a wheel brake cylinder or a group of wheel brake cylinders and a brake fluid compartment placed between the main cylinder and the wheel brake cylinder or the group of wheel brake cylinders, which compartment is made up of a cylinder and a piston movable in this cylinder by the brake cylinder pressure acting on this piston against the force of a prestressed spring.

1 Claim, 3 Drawing Figures

PRESSURE LIMITING DEVICE FOR VEHICULAR BRAKE SYSTEMS

BACKGROUND OF THE INVENTION

In a pressure limiting device of this type already known the brake fluid compartment is in the form of a separate device placed in a brake line from the main cylinder to the wheel brake cylinders of a wheel and axle assembly and has a piston with a closing device on its frontal surface and with a pressure impact surface which is considerably smaller than that of the entire frontal surface of the piston. If the closing device is in the closed position, only the relatively small pressure impact surface of the closing device is struck by the brake pressure in the brake cylinder. Upon brake cylinder pressure reaching a certain maximum value, however, the closing device is lifted from its seat, so that the brake cylinder pressure then acts upon the entire frontal surface of the piston.

Due to the difference between the surface of the closing device and that of the whole piston that can be subject to the brake pressure there also results a difference between the relatively high maximum brake cylinder pressure at which the closing device is lifted from its seat and the relatively low brake cylinder pressure at which it closes again. The known pressure limiting device thus has the disadvantage that after activation of the device at a relatively high brake cylinder pressure value, the brake pressure is suddenly reduced to a considerably lower limiting value, in such a way that it can only rise again to the maximum brake pressure value after replacement of the closing device on its seat, falling short of the lower limiting value.

SUMMARY OF THE INVENTION

The present invention has the task of avoiding this drawback and creating a pressure limiting device of the type mentioned at the beginning which constantly limits the brake cylinder pressure to a certain maximum value and is also structurally simple and easy to mount.

According to the present invention this task is solved by the fact that the piston of the brake fluid compartment has a constant area or impact surface which is constantly subject to the brake cylinder pressure.

In this manner the brake cylinder pressure is always limited to a maximum value kept constant by the constant area of the piston surface subject thereto, which makes possible a complete utilization of the braking capacity of the braking device.

In one advantageous prototype of the invention with brakes of the type in which the main cylinder can be supplied with fluid from an equalizing tank it is intended to house the brake fluid compartment and the prestressed spring in the equalizing tank.

Thereby the equalizing tank and the pressure limiting device will be comprised in a single, space-saving unit, making mounting easier and also making it possible to use parts of the equalizing tank as parts of the pressure limiting device, thus simplifying the structure of the device.

The equalizing tank and the lid attached thereto is most advantageously formed as the cylinder of the brake fluid compartment in which the piston of the brake fluid compartment can be moved sealed, roughly coaxially to the equalizing tank.

It is advantageous in that the piston of the brake fluid compartment can be moved against a cup-shaped spring plate between which and the adjacent surface of the lid attachment a prestressed spring is supported.

In another satisfactory prototype of the invention the prestressed spring is supported in the equalizing tank at one end by the cup-shaped spring plate, and at the other end by a lid of the equalizing tank which can be firmly connected to the lid attachment at the opposite end by a screw.

The piston of the brake fluid compartment can be sealed by a gasket placed in a groove in the lid attachment.

In the following, a prototype of the invention is described in more detail, with reference to the drawings.

As is known, such steering brake devices serve to steer the tractors either by activating the wheel brake or group of wheel brakes on only one side of the vehicle, or to brake them by simultaneous activation of the wheel brakes or group of wheel brakes on both sides of the vehicle.

Figure 2:
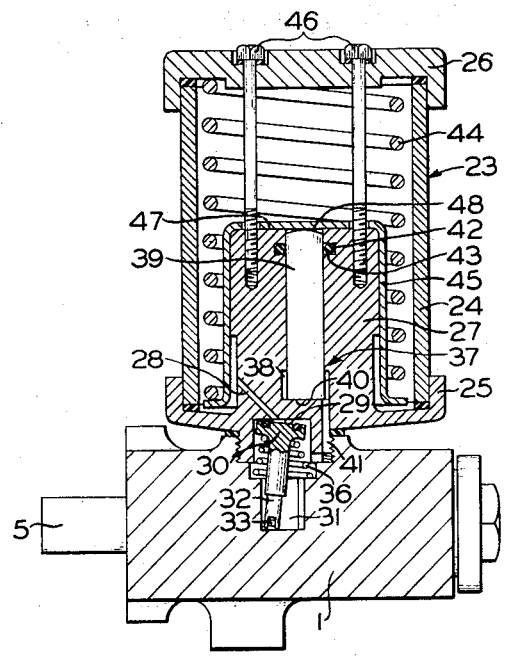
FIG. 2 shows a vertical section of the steering brake device along line 2—2 of FIG. 1 and looking in the direction of the arrows.
Figure 1:
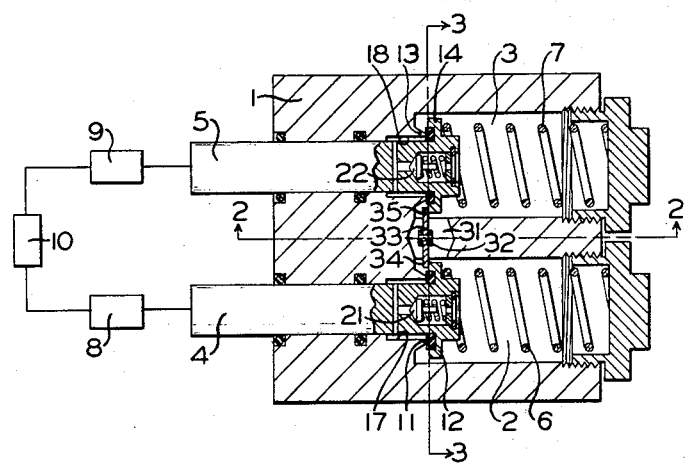
FIG. 1 shows a horizontal longitudinal section of the steering brake device.
Figure 3:
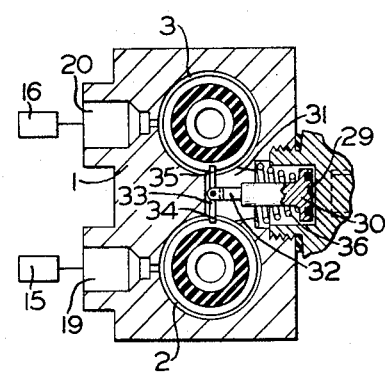
FIG. 3 shows a cross section of the steering brake device along line 3—3 of FIG. 1 and looking in the direction of the arrows.

The steering brake device illustrated in FIGS. 1, 2 and 3 shows two main or master cylinders 2 and 3 placed in a common housing 1, whose brake pistons 4 and 5 can be moved against the return springs 6 and 7 by pedals 8 and 9, either singly, or after joining the two pedals by means of a tie bar 10 of any suitable construction, jointly.

Brake pistons 4 and 5 have a check valve 11, 12 and 13, 14 in the form of a valve and valve seat. The main cylinders 2 and 3 can be connected with a right and left wheel brake cylinder 15 and 16 via the corresponding check valve 11, 12 and 13, 14, an annular slot or groove 17 and 18 and a housing boring 19 and 20.

In each of the pistons 4 and 5 there is a back pressure check valve 21 and 22 which can open in the direction from the corresponding wheel brake cylinder 15 and 16 towards the corresponding main cylinder 2 and 3, to create a connection between the two cylinders.

An equalizing reservoir or tank 23, consisting of a hollow cylindrical body 24 and two lids or pressure heads 25 and 26 can be connected with the two main cylinders 2 and 3 via an oblique boring 28 in the hollow cylindrical attachment 27 integral with the lid 25, a connecting valve 29, 30 common to the two main cylinders and a recess 31 in housing 1. The recess 31 connects the two main cylinders 2 and 3 with one another.

The connecting valve 29, 30 in the form of a tilt valve, can be activated through a tilt arm 32 and a cross bar 33 with arms 34 and 35 of roughly the same length interacting with a spring 36. The cross bar 33 can be moved in the recess 31 both roughly parallel to the axis of cylinders 2 and 3 and around the end of one arm to rock the middle line of the tilting arm 32. Its arms 34 and 35 project into the displacement path of the brake pistons 4 and 5 in such a way that the latter can carry along the corresponding arms 34 and 35 in the direction of brake release.

A pressure limiting device 37 in the form of a brake fluid compartment consists of a cylinder 38 in the lid attachment 27 of the lid 25, in which cylinder 38 a sealed piston 39 can be moved, whose constant area impact surface 40 is always subject to the brake cylinder pressure via a boring 41 opening into the recess 31. The seal of the piston 39 is achieved by means of a gasket ring 42 placed in a groove 43 in the lid attachment 27.

There is a spring 44 in the equalizing tank 23, prestressed between a cup-shaped spring supporting plate 45 and the upper lid 26 of the equalizing tank 23. The lid 26 is firmly joined to the attachment 27 of the lid 25 by means of the screws 46.

The cup-shaped spring supporting plate 45 is placed on the lid attachment 27, centered by the lid attachment and supported by a frontal surface 47 of the lid attachment. The piston has lightly rounded frontal surface 48 with which it can press against the spring plate 45. The length of the piston 39 is so dimensioned that it is movable with a slight longitudinal axial play in cylinder 38 before it abuts the spring plate 45 supported on the lid attachment 27.

The pressure limiting device works as follows: Upon activation of the brake by pressing down the pedals 8 and/or 9 the brake pistons 4 and/or 5 are displaced axially, as a result of which the check valves 11, 12 and/or 13, 14 are opened, while the tilt valve 29, 30 is closed with the aid of the spring 36. This opens the connection between the main cylinders 2 and/or 3 and the wheel brake cylinders 15 and/or 16, while on the other hand the connection between the main cylinders 2 and 3 and the equalizing tank 23 is broken.

The activation of the brake pistons 4 and/or 5 results in building up a brake pressure in the main cylinder 2 and/or 3, which acts on the one hand in the wheel brake cylinders 15 and/or 16, and on the other on the constant area pressure impact surface 40 of the piston 39 of the pressure limiting device 37. The latter serves to ensure that the brake cylinder pressure will not exceed a certain limiting value. This limiting value is reached when the force of the brake cylinder pressure impact acting on the piston 39 is in a state of equilibrium with the opposing initial stressing force of the spring 44. Any further activation of the brake pistons 4 and/or 5 in the form of stronger braking then leads to movement of the piston 39 against the spring 44, as a result of which the brake fluid can be deflected into the cylinder 38 in the limiting device 37 the volume of which cylinder is becoming larger, so that no increase in brake pressure can develop in the main cylinders 2 and 3 and thus in the wheel brake cylinders 15 and/or 16, the brake cylinder pressure thus being no higher than the limiting value, which is determined by the initial stress of the spring 44. Since the impact surface of the piston 39 is always constant, the limiting value of the brake cylinder pressure achieved with the pressure limiting device 37 is also always constant.

The pressure limiting device 37 described has the advantage that the brake fluid taken up by the brake fluid compartment is immediately available again upon reduction of the brake cylinder pressure, since the piston 39 loaded by the spring 44 presses fluid into the main cylinders 2 and 3 without delay. Another advantage is that the pressure limiting device 37 has a completely sealed brake fluid compartment, which prevents any leaks affecting the exact constancy of the set limiting values of the brake cylinder pressure. The placement of the brake fluid compartment in the equalizing tank and the combination of the two devices into one structural unit leads to a space-saving, structurally simple, easy to mount construction.

Having now described the invention, what I claim as new and desire to secure by Letters Patent, is:

1. The combination of:
    a vehicle fluid pressure brake apparatus and a brake cylinder pressure limiting device therefor, said brake apparatus comprising:
    a. a brake cylinder,
    b. a master cylinder for supplying fluid under pressure to said brake cylinder, and
    c. a reservoir from which fluid is supplied to said master cylinder, said reservoir comprising:
        i. a first hollow cylinder,
        ii. a pair of pressure heads for closing the respective opposite ends of said first hollow cylinder, one of said pressure heads having formed on one side thereof and integral therewith a second hollow cylinder of lesser diameter than said first hollow cylinder, said second hollow cylinder being coaxially disposed within said first hollow cylinder, and
    said brake cylinder pressure limiting device comprising:
    a. a piston slidably mounted in said second hollow cylinder,
    b. a resilient member forming an annular seal between the periphery of said piston and the wall surface of said second hollow cylinder,
    c. conduit means constantly connecting said master cylinder and one end of said second hollow cylinder whereby the area of that end of said piston adjacent said one end of said hollow cylinder is constantly subject to the pressure of the fluid in said master cylinder, and
    d. a precompressed biasing means disposed within said first hollow cylinder in surrounding relation to said second hollow cylinder and interposed between the other one of said pair of pressure heads and said piston for normally biasing said piston toward said one end of said second hollow cylinder.

2. A brake cylinder pressure limiting valve device, as recited in claim 1, further characterized by a cup-shaped spring seat supported on the other end of said first hollow cylinder and having integral therewith a flange between which and the other of said pressure heads said precompressed biasing means is interposed whereby said piston is effective, upon the pressure of the fluid in the master cylinder acting thereon establishing a fluid pressure force in excess of the force of said precompressed biasing means, to move said spring seat against the yielding resistance of said precompressed biasing means.

3. A brake cylinder pressure limiting valve device, as recited in claim 2, further characterized by screw-threaded means connecting said other pressure head to said other end of said first hollow cylinder, and by a plurality of openings provided in said cup-shaped spring seat through which said screw-threaded means extend.

* * * * *